United States Patent Office 2,917,395
Patented Dec. 15, 1959

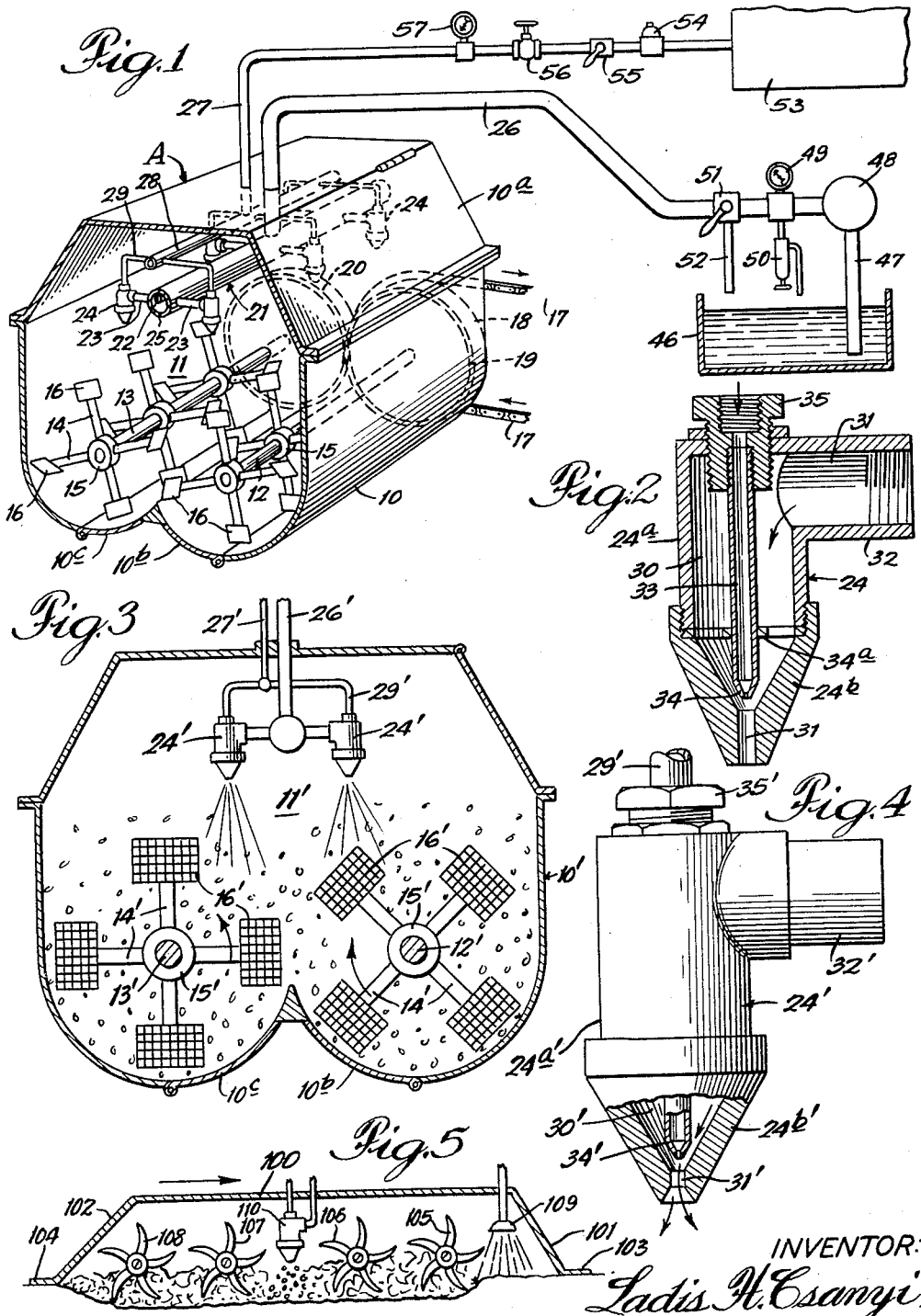

2,917,395

METHOD FOR COMBINING A BITUMINOUS BINDER WITH AN AGGREGATE MATERIAL

Ladis H. Csanyi, Ames, Iowa, assignor to Iowa State College Research Foundation, Inc., Ames, Iowa, a corporation of Iowa Application June 24, 1957, Serial No. 668,282

6 Claims. (Cl. 106—122)

This invention relates to a method for combining a bituminous binder with an aggregate material. The method and apparatus of this invention have particular utility in connection with soil stabilization, being adaptable to either plant mix soil stabilization or in place soil stabilization. The method and apparatus, however, are applicable generally to the preparation of bituminous aggregate mixes, including ungraded aggregate mixes as well as standard specification mixes.

The principal object of this invention is to provide an improved method and apparatus for combining bituminous binders with all types of aggregate materials. A more specific object is to provide a method and apparatus of the character described which lend themselves to soil stabilization operations and also to the preparation of mixes from ungraded aggregates. Further objects and advantages will appear as the specification proceeds.

This invention is shown in illustrative embodiments in the accompanying drawing, in which—

Figure 1 is a cut-away perspective view of a mixing apparatus constructed in accordance with this invention together with certain auxiliary equipment which is shown somewhat diagrammatically for purpose of clarity; Fig. 2, an enlarged detailed sectional view of one of the foaming spray nozzles of the apparatus of Fig. 1; Fig. 3 is a cross-sectional view of a mixer unit similar to the one shown in Fig. 1, but illustrating a modification coming within the scope of this invention; Fig. 4, an enlarged detailed view, partly in section, of one of the modified spray nozzles of the mixer unit of Fig. 3; and Fig. 5, a side elevational sectional view of an in place soil stabilization apparatus constructed according to this invention, the apparatus being shown somewhat diagrammatically for illustrative purposes.

The method of this invention is characterized by the use of a foamed bituminous binder. A bituminous binder, such as an asphaltic binder, can be foamed easily by several methods. One method involves the addition of small quantities of water to the asphalt and then heating the asphalt. The same result is secured by gradually injecting small quantities of steam (preferably saturated steam) into the heated asphaltic binder. In practicing the method of this invention, however, it is preferred to use a foaming nozzle, the construction of which will subsequently be described in detail, in combination with an aggregate mixing unit.

Asphalt cement and other bituminous binders expand to many times their original volume when foamed. Therefore, if a quantity of asphaltic binder is applied to a foam, a wider and more uniform distribution of the binder can be obtained in mixing with aggregates than if the same quantity of binder is used as a liquid. An asphalt cement having a penetration of 85 to 100, when foamed, will have a penetration of over 300 at the same temperature for some after it has been foamed. Chemical constituent tests indicate that the asphalt has not been changed even though its consistency and viscosity have changed. This change in physical properties is apparently due to the bubbles of gas or vapor the mass of material contains. Therefore, if foamed asphalt is added in mixing, the distribution of the binder throughout the asphalt can be accomplished at a much lower temperature than if the binder is added as a liquid. Further, since the binder remains soft for some time as a foam, mixes using foamed asphalt as the binder can be laid at low temperatures. The foamed asphalt cement has a rubbery nature and is extremely sticky, with both high cohesive and high adhesive properties. When a foamed asphalt is used as a binder in a bituminous mix, it has been discovered that there is improved adhesion between binder and aggregate, and that a more cohesive mix results. The high adhesive property noted may be due to the high wetting power of the foamed bituminous binder. Also, the modified surface tension of the asphalt as a foam probably plays an important part in this behavior.

Another great advantage is that the bituminous binder is in the form of bubbles. Such foams provide in effect ready-made thin films of bituminous binder with powerful natural surface tension forces available to coat particles of matter on contact as the bubbles break. The fact that foamed bituminous binders will penetrate small voids and crevices can be utilized to advantage because foamed binders will penetrate agglomerations of dust which liquid binders will only coat with layer of binder. Foamed binders thus lend themselves more readily to soil stabilization than ordinary liquid binders.

In practicing the method of this invention, various apparatus can be employed, such as the types of apparatus illustrated in Figs. 1–5 of the drawing.

Looking first at Figs. 1 and 2, there is shown a mixing apparatus A having a casing 10 which provides a mixing chamber 11 therein. Laterally spaced-apart shafts 12 and 13 extend across the lower portion of chamber 11. It will be understood that the ends of these shafts are mounted in suitable bearings so that they can be rotated at high velocities. Each shaft is provided with a plurality of outwardly-projecting mixing arms 14 which are attached to hubs 15 that are rigidly locked to shafts 12 and 13. The arms 14 on each shaft are arranged to intermesh with the arms on the other shaft, as indicated in Fig. 1. In the illustration given, the outer ends of arms 14 are equipped with solid plates 16. As indicated in Fig. 1, the plates 16 are disposed in angular relations to the rotational planes of the arms about shafts 12 and 13. Means are provided for simultaneously rotating shafts 12 and 13 in opposite directions with the arms 14 on each shaft moving upwardly during the intermeshing thereof, as indicated by the rotational arrows in Fig. 1. In the illustration given, a chain 17 drives a sprocket wheel 18 on the end of shaft 12, which shaft end also carries a gear wheel 19 that drives an opposed gear wheel 20 on shaft 13, thereby rotating shaft 13 at the same velocity but in an opposite direction from shaft 12.

Within the upper portion of chamber 11 is supported a structure which can be collectively designated as a spray bar 21. More specifically, spray bar 21 includes a liquid distribution manifold 22 communicating with a plurality of outwardly extending branch pipes 23 on the end of which are mounted nozzles 24. Distribution manifold 22 is encased in a jacket 25 to which heating fluid can be supplied when desired. The liquid to be sprayed is supplied to manifold 22 through conduit 26. The gas or liquid foaming agent for foaming the liquid as it is sprayed is supplied through conduit 27 to another manifold 28 from which it is distributed to the nozzles 24 through branch pipes 29.

Figure 2 shows the interior construction of nozzles 24. These nozzles include a body portion 24a and a tip portion 24b which together provide interiorly a flow chamber 30. Tip portion 24b has a restricted orifice or outlet passage 31 communicating with flow chamber 30 on its inside and discharging to the atmosphere on its outside. Body portion 24a is adapted to supply liquid to flow chamber 30 from pipe 23 through nipple extension 32. Preferably, tip portion 24b consists of a conical fitting which is threadedly connected to body portion 24a, and the outer ends of elbow extension 32 are interiorly threaded for connection to pipe 23. Nozzle 24 also includes a gas or foaming agent supply tube or conduit 33 which extends through chamber 30 from the top thereof to a point adjacent the inside of orifice 31. Conduit 33 terminates in an outlet 34 which is within tip portion 24b and which is oriented toward orifice 31. In the illustration given, the centered relation of conduit 33 within chamber 30 is established by ring 34a which slidably receives conduit 33. The upper end portion of conduit 33 is threadedly connected to a plug fitting 35, which in turn is threadedly connected to the top wall of body portion 24a. The outer interior portion of plug 35 is threaded to receive the threaded ends of foaming agent-distribution pipes 29. It will be seen that the conduit 33 can be advanced toward or retracted from orifice 31 by the rotation of plug connector 35, and a further adjustment can be made, if desired, by rotating conduit 33 with respect to plug 35. It will be understood that centering ring 34a is provided with cut-out segments so that the upper and lower portions of the chamber 30 are in open communication.

The auxiliary liquid supply equipment, as shown in Fig. 1, consists of a liquid measuring device 46, a suction line 47, a pump 48, a pressure gauge 49, a pressure relief valve 50, an operating valve 51, and a circulating line 52. The auxiliary foaming agent supply equipment associated with line 27 includes a supply source 53, a pressure regulator or control 54, an operating valve 55, a volume control valve 56, and a pressure gauge 57.

Referring now to the embodiment of Figs. 3 and 4, it will be noted that the various parts of the apparatus have been given corresponding numbers to the parts of the apparatus of Figs. 1 and 2, except that the numbers have been primed to indicate that they are applied to a modified construction. Briefly, the apparatus of Figs. 3 and 4 includes a pair of shafts 12' and 13' which are mounted in aligned, spaced-apart relation in the lower portion of chamber 11'. A plurality of hubs 15' are mounted on shafts 12' and 13' in axially-spaced-apart relation for rotation with the shafts. Hubs 15' carry the outwardly-extending arms 14' upon the end of which are mounted the fluffing tips or sieve plates 16'. When finely-divided solids, such as a mineral aggregate, is charged to chamber 11' and shafts 12' and 13' are rotated at relatively high speeds, the particles of aggregate will be combed or sieved and cast upwardly into the upper portion of chamber 11', as indicated in Fig. 3. It will be understood that shafts 12' and 13' will be rotated in the direction indicated by the arrows in Fig. 3 so that the arms 14' and the tips 16' move upwardly when they are in directly opposed relation. As a result of the fluffing and lifting action of sieve plates 16', the finely-divided solids will be cast upwardly into the atmosphere within the confined space provided by chamber 11', and this will be continuously repeated, thereby maintaining a cloud of gas-borne particles within the upper portion of chamber 11'. The gas-borne particles will be dispersed so that the particles of the solid material tend toward a substantial separation. The details of construction of sieve plates 16' are set forth more fully in my copending application Serial No. 592,590, filed June 20, 1956, now Patent No. 2,861,787, of which the present application is a continuation-in-part. Instead of the specific sieve plates 16', the mixing arms 14' can be equipped with other forms of fluffing tips of a perforated, open construction while achieving generally the same manner of operation and the same results. In the particular embodiment of Figs. 3 and 4, the liquefied bituminous binder is foamed by mixing the binder with steam, as with the embodiment of Figs. 1 and 2. The foamed mixture of steam and binder is then sprayed in an expanding stream of minute, discrete bubbles into a cloud of air-borne particles, thereby bringing the particles into contact with the bubbles of binder. These steps are continued until the particles of the mineral aggregate or other finely-divided solid are converted to a pulverulent mastic or mortar. More specifically, the foaming and spraying steps just described are carried out in the plurality of nozzles 24' which are mounted in the upper portion of chamber 11'. The liquid bituminous binder supplied to these nozzles through pipe 26', while the steam is supplied thereto through pipe 27'. As shown more clearly in Fig. 4, the liquid flows through a chamber 30' provided by nozzle body 24a' and tapered nozzle tip 24b' until it is discharged through restricted orifice 31'. The steam from pipe 27' is conveyed by a tube 34' to a point adjacent the inside of orifice 31' where it is injected into the flowing stream of binder and mixed therewith under pressure. This converts the binder into a foam. The expansion of this foam through orifice 31' breaks it into many separate minute bubbles.

It will be noted that the orifice or outlet passage 31' of the nozzle shown in Fig. 4 is of considerably shorter length than the outlet passage 31 of the nozzle shown in Fig. 2. This difference in the length of the restricted orifice passage does not affect the production of a foam, but it does have a definite bearing on the way in which the foam is applied to the aggregate material. If it is desired to break the foam up into more or less discrete bubbles, a very short orifice passage, such as that illustrated in Fig. 4, can be employed. On the other hand, if it is desired to keep the foam as a "congealed" bubble mass, this can be done by using a nozzle with a relatively long orifice passage, such as illustrated in Fig. 2. It will be readily apparent, of course, that intermediate length orifice passages can be used to obtain a foam spray containing both discrete bubbles and congealed masses of bubbles. In working with certain types of dry aggregate materials, especially when the aggregate materials are being processed in a mixing unit wherein the mixing arms have fluffing tips of a perforated, open construction, as described above, it may be highly advantageous to apply the foam in an expanding stream so as to separate it as much as possible into discrete bubbles. This procedure is described in greater detail in my copending application Serial No. 595,218, filed July 2, 1956, and now abandoned, of which this application is also a continuation-in-part. On the other hand, when working with moist aggregates, such as soils containing from 6 to 16% moisture, it will probably be more desirable to utilize an apparatus like that illustrated in Figs. 1 and 2, wherein the paddle tips are of solid construction, and the spray nozzles have relatively long orifice passages, thereby depositing more or less congealed masses of foam onto the moist aggregate material as it is being mixed. In this way, the foamed bituminous binder can easily be distributed throughout the aggregate material by an essentially kneading-type of action. Finally, however, it may be noted that the combination of solid paddle tips with nozzles having intermediate orifice passage lengths gives versatility when incorporated in a mixer unit like that of Fig. 1, and that the partially dispersed foam lends itself well to combining with all kinds of aggregate materials ranging from dry to 16 to 20% moisture (extremely wet). For further details with respect to the processing of aggregate materials of relatively high moisture content, reference is hereby made to my copending application Serial No. 596,103, filed July 5, 1956, and now abandoned, of which the present application is a continuation-in-part.

In the apparatus and method of this invention, the bituminous binder and steam can be brought together and foamed at pressures ranging from 25 to 125 pounds per square inch. For example, steam may be supplied at 50 to 90 pounds, while the bituminous binder can be pumped through the nozzles at a slightly lower pressure, say from 20 to 80 pounds. It will be understood, of course, that the steam and binder pressures employed will affect the degree of the dispersal of the foam after its discharge through the orifice passages of the nozzles. However, for any particular orifice diameter, it is a simple matter to vary the length of the passage after the desired operating pressures have been selected, and thereby obtain the type of foam spray which is desired, ranging from discrete bubbles to congealed foams. For example, in operating at the pressures just indicated, congealed foams can be obtained with a nozzle passage of from ⅜ to 1 inch in length and from ⅛ to ¼ inch in diameter. An intermediate type of foam discharge can be obtained by shortening the nozzle orifice passage to ¼ inch in length. With a nozzle of this construction, an asphalt pressure as low as 20 p.s.i.g. can be used in combination with a steam pressure of from 40 to 50 p.s.i.g. If the length of the nozzle passage is reduced to less than ¼ inch, the foam will be discharged in a greater state of dispersal, until the stage approximating an abundance of discrete bubbles is achieved. It should be noted, however, that the use of the foam itself, whether in a congealed or dispersed form, is of major significance in achieving the broad objects of this invention.

Fig. 5 is a somewhat schematic illustration of an apparatus which might be employed in applying the method of this invention to in-place soil stabilization. The unit is moving along the surface of the ground in the direction indicated by the arrow, it being understood that some means (not shown) is provided for accomplishing this movement. In the simplified illustration given, the apparatus includes an elongated casing 100 having a hollow interior and an open bottom adjacent the ground surface. The casing includes downwardly inclined front and rear walls 101 and 102 which terminate in horizontally extending ground runner portions 103 and 104. Internally, the unit includes four sets of ground-cutting and mixing blades 105, 106, 107 and 108, all appropriately mounted on power-driven shafts. The cutting and mixing blades are arranged so as to dig into the surface of the ground, preferably to an adjustably variable depth. Just in front of the first set of cutting and mixing blades 105, there can be provided one or more water sprayheads 109, the purpose of which will subsequently be described. Just in front of the third set of cutting and mixing blades 107, there is provided one or more foaming nozzles 110 of the type heretofore described.

For the in-place stabilization of soil, it is preferable to have the soil sufficiently moist so that its condition will be relatively soft, thereby permitting it to be easily broken up into relatively small particles. This moisture content has also been found to be an advange in combining the soil with a foamed bituminous binder, such as as asphaltic cement. It will be readily understood that the soil which is to be stabilized may already contain sufficient water. On the other hand, it may be too dry, and there is even the possibility that it may be too wet. The state of the soil, of course, can easily be determined at the start of the operation. Any additional water required can be sprayed onto the soil either prior to the stabilization operation, or as a part thereof. In the embodiment illustrated in Fig. 5, it is contemplated that the water will be applied to the soil through sprayhead 109, which is located just in front of the first set of cutting and mixing blades 105. If the soil should already contain sufficient water, the operation can be carried on with the same apparatus, but no water being sprayed through head 109. In the event that the soil should contain too much water, the stabilization unit can be passed over the soil several times just for the purpose of aerating and thereby reducing the moisture content of the soil. In these aeration passes, no water would be applied through spray head 109, of course, and neither would any binder be supplied through foaming nozzle 110.

In a typical operation when the soil contained around 5–8% moisture and could tolerate additional water without becoming too wet for processing, the unit of Fig. 5 would be started, and moved forward at a slow rate in the direction indicated by the arrow of that figure. Additional water would be supplied to the soil through spray head 109, the soil then being cut free to a depth of several inches, and mixed and broken down to small particle size by the operation of blade sets 105 and 106. The loosened and disintegrated soil then redeposited upon the surface of the ground would come under spray nozzle 110 which would deliver a foamed bituminous binder onto its surface. The foamed binder and the moist, disintegrated soil would then be thoroughly intermixed by blade sets 107 and 108. The soil and binder mixture, after being redeposited, could be further compacted by some auxiliary rolling equipment (not shown). Some moving of the surface of the soil, however, would be obtained through the action of the horizontally extending portion 104 of casing 100.

It will be understood that the optimum amount of water for an in-place soil stabilization operation of the type just described will vary somewhat with the type and character of the soil. In sandy soil substantially free of clays as little as 4% moisture may be sufficient, while in heavy clayey soils, as much as 22% moisture may not be objectionable. For most average soils, however, a moisture content of from 8 to 10% will give good results. This compares with conventional plant soil stabilization operations in which the soil is first dried, and then ground before being treated with the bituminous binder. In such operations, the moisture content of the dry, ground soil would ordinarily range from about ½ to 1%. After the completion of the soil stabilization mix, the stabilized soil that is returned to the site of use might contain from 2 to 3% moisture.

The method of this invention is also applicable to plant mix soil stabilization. In this application, an apparatus similar to that illustrated in Figs. 1 and 2 might be employed for the purpose of combining the soil with the foamed binder. If the soil contained sufficient moisture as previously described, it will not be necessary that the soil be first dried and ground before it is introduced into the mixer unit. The moist, raw soil can be charged to the mixer unit, and the unit run for a few minutes until the soil has disintegrated. Then the foamed asphalt can be applied in the manner previously described for other aggregate materials. It has been found that the presence of the water in the soil does not hinder the distribution of the foamed asphalt through the soil or prevent the coating of the particles. Rather, it appears to assist both the distribution and coating for reasons which are not entirely clear.

In the stabilization of soils, it is desirable to first mix the moist soil until a smooth, homogeneous, non-lumpy mix is obtained, and then to apply from 4 to 10% of a foamed asphaltic cement. For in-place soil stabilization, of course, the required proportion of a binder can be determined by the depth to which the soil is being treated. In soil stabilization, it is not necessary to coat absolutely all of the particles, since desired results can be obtained by coating only some of the particles. This permits much lesser proportions of the binder to be used than in the preparation of bituminous road-surfacing mixes. In the stabilization of soils, whether in plant operations or in place, it is not necessary to heat the soil before it is treated with the foamed binder. In working with other types of aggregates for producing road construction mixes, it may be desirable to heat the aggregates, but the required temperatures would be substantially lower than those presently employed in similar operations.

As previously indicated, the character of the aggregate material is not particularly critical, and it is feasible to use any of the aggregates of the type which have heretofore been employed with bituminous binders for various purposes. Usually, aggregate material will consist primarily of mineral particles. The mineral aggregate can be graded or ungraded, but it preferably contains a substantial proportion of mineral flour. For paving purposes, the mineral flour combines first with the bituminous binder to provide a mastic, then with fine aggregate during mixing to form a bituminous mortar. When coarse aggregate is used in the mix a bituminous mix is produced in the mixing operation for use as a bituminous or asphaltic concrete. The aggregate material, particularly in conjunction with stabilization operations, will include a major proportion of soil or sand or similar material.

Various bituminous binders can be used in practicing this invention. For most purposes, the asphalts are preferred, and are most easily used in the form of asphaltic cements, rather than as cutback asphalts or emulsified asphalts. The method of this invention has particular advantage when the mineral aggregate consists of a major proportion of a natural ungraded aggregate material and a minor proportion of a mineral flour. The ungraded aggregate can be sand or fine gravel, which normally provides particles having a wide range of mesh sizes, and the mineral flour can be a material such as powdered limestone. Usually, the so-called mineral "flour" or dust will have substantially more than 50% passed through a No. 200 sieve, and will therefore substantially range from a minus 200 mesh size down to colloidal size. Other mineral dusts include such materials as flyash, marble dust, sand substantially passing the 200 mesh sieve, etc. Loess composed primarily of silt and clay, after drying and pulverizing, can also be used as a mineral flour. The loess will be suitable, even though it contains from 10% to 40% of clay, because the fine particles will be completely coated and sealed against water by the foam-coating operation of this invention. Although the relative proportions of ungraded aggregate and mineral flour can be varied considerably, according to well known principles of proportioning the aggregate, it will usually be desirable to employ from 20% to 30% of mineral flour and a corresponding 70% to 80% of the ungraded aggregate.

The present invention, both in its method and apparatus aspects, is further illustrated by the following specific examples.

EXAMPLE I

A mixer unit similar to the one illustrated in Fig. 1 was used to prepare soil stabilization-type mixes for study and testing. The specific mixer was a 300 pound capacity, batch type, standard twin shaft plug mill mixer, equipped with conventional kneading paddle tips and operating at a shaft speed of about 90 r.p.m. The mixer was also equipped with a foamed asphalt system having two foam nozzles on the spray bar. The nozzles were adjusted to produce a concentrated foam of the binder when the system operated at 20 p.s.i. pressure for the binder and about 50 p.s.i. for the saturated steam pressure.

Tests were first made on mixes containing 75% fine sand and 25% raw loess by weight as aggregates, and 5% and 6% 150 to 200 penetration asphalt cement introduced into the mix in the form of a concentrated foam as the binder. The fine sand was graded as 99% passing a No. 4 sieve and 20% passing a No. 40 sieve. The loess contained 38% clay, with agglomerations and lumps as large as 3 inches in diameter. Both materials were used at air temperature and contained some moisture. The materials were proportioned by weight in 150 pound batches containing 75% fine sand and 25% raw loess.

The proportioned aggregates were placed directly into the mixer. The mixing was started, and water was added to the materials in the mixer until the raw loess softened, agglomerations and lumps broke apart, and the loess was uniformly distributed throughout the mix. The quantity of water needed depended upon the initial moisture in the aggregates. It was found, however, that a total moisture content of about 8% in the mixer was sufficient to break down and distribute the loess. It was also found that about 30 seconds of mixing was required to secure a uniform mixture. As soon as a uniform mixture was secured, the binder, a 150 to 200 penetration asphalt cement at 300° F., was added to the mix in the form of a concentrated foam. Mixes containing 5% and 6% of binder by weight were produced. The time required to add the binder in this manner was about 10 seconds. Mixing was continued after the addition of the binder for about 20 to 30 seconds to provide for the distribution of the binder throughout the mixture. The total mixing time per batch was about 60 to 70 seconds. Excellent mixes were produced of uniform character containing an evenly distributed mastic.

Immediately after mixing, Hubbard-Field stability test specimens, 2 inches in diameter and about 1 inch in height were prepared. These specimens were tested three days after forming for Hubbard-Field stability at 140° F. after 1 hour immersion in a hot water bath at 140° F. Void content determinations and freezing and thawing tests were also made on these specimens.

The results of these tests are as follows:

Table A

[Mix: 75% fine sand, 25% raw loess.]

| | 6% A.C. | 5% A.C. |
|---|---|---|
| Moisture content during mixing 8%: | | |
| Hubbard-Field Stability— | | |
| 77° F. Dry | 3,000 | 3,100 |
| 140° F. Dry | 1,650 | 2,200 |
| Standard 140° F. Wet | 600 | 650 |
| Percent in voids compacted mixture, not corrected for moisture | 12 | 14 |
| Unit weight, pounds per cu. ft | 148 | 151 |
| Resistance to Freezing and Thawing | Good | Good |
| Max. Volume Change, percent | 4 | 3.6 |

EXAMPLE II

About three tons of the mix containing 6% A.C., as shown in Table A of Example I was prepared and laid as a small field test area. The test was placed as a section of a roadway, 8 feet wide, 20 feet in length, and 6 inches in depth, carrying about 400 cars a day. The mix laid in one lift 6 inches in depth spread easily and smoothly by raking. The mix was compacted readily by medium weight wobble wheel pneumatic rolling to a compacted depth of 5 inches. The test pavement was opened to traffic 18 hours after laying. The behavior of the pavement was observed daily for about seven days. No settlement, ravelling, or rutting was observed, even after a heavy rain on the third day during this period. Slight scuffing of the surface was however noted which led to the decision to seal the surface. The surface was sealed on the eighth day with a single layer sand seal. This seal consisted of a prime coat of 0.1 gallon MC–0, followed by 0.2 gallon, 150–200 pen. A.C. and 20 pounds of coarse sand per square yard. This pavement performed excellently for the four months of the test, although weather conditions during this period varied from 90° F. and 10° F. with heavy rains, snow and ice on the surface.

EXAMPLE III

The applicability and the efficacy of the use of a bituminous binder in the form of a foam in in-place bituminous soil stabilization was tried and tested on a Seaman-Andwall Pulvi-Mixer, stock model D.S. 47 having an eight foot wide hood assembly.

Since this machine was a standard model, it was adapted to the foamed binder process with as little modification of the base unit as possible. The equipment necessary for this adaption included a small steam boiler to furnish the steam required for foaming the binder, a spray bar equipped with foaming nozzles at the assembly hood, and such piping, fittings, and controls as were necessary to convey the steam and binder to the spray bar.

The steam boiler used was a 60 gallon capacity steam jenny type fired by an automatic pressure controlled electric fuel burner. Steam pressure of this boiler could be automatically controlled at any pressure between 5 and 100 pounds. This boiler was mounted on temporary steel bracket supports at the front end of the mixer. A small motor generator set was mounted on the running board of the mixer to supply the power needed to operate the electric fuel oil burner. Two main steam lines, each ¾ inch in diameter and insulated, were installed to convey steam from the boiler to the spray bar. One line, fitted with suitable operating controls for controlling the pressure and volume of the steam, was used to furnish steam to the foam nozzles. The other line was used to furnish steam to heat the steam jacketed spray bar.

The spray bar installed just in front of the hood assembly consisted of eight 2 inch I.D. steam jacketed T fittings bolted together with one small steam jacketed straight section to form a continuous spray bar spanning the width of the hood assembly. Each T fitting of the spray bar was equipped with a bituminous foam nozzle like the one illustrated in Fig. 2. The spray bar was so adjusted and positioned that the eight nozzles sprayed a uniform spread of foamed binder in front of the cutter and mixer blades of the hood assembly. The main steam lines from the boiler were connected to two steam manifolds, one of which distributed saturated steam to the nozzles, and the other steam to the steam jacketed sections of the spray bar. Steam operating pressure and volume controls on the main steam line carrying steam to the nozzles were placed within easy reach of the operator in the driver's seat.

The bituminous binder used in the operation was heated in a 160 gallon asphalt heater kettle. This kettle was towed alongside the mixer by an outrigger tow bar temporarily mounted on one side of the mixer. The binder was pumped from the kettle to the spray bar by a gasoline engine drive asphalt pump mounted on the kettle. A flexible metal hose connected this pump to the spray bar. Operation of binder controls was done manually by signal from the mixer operator. The mixer and asphalt supply kettle moved forward in unison during in-place soil stabilization operations.

The operation of the Pulvi-Mixer, adapted in the manner described to the use of a foamed bituminous binder, was tested on a section of test road 24 feet wide and about 250 feet in length. The surface of the test area consisted of a layer of power plant cinders about 1½ to 2 inches thick laid upon a natural heavy clayey soil. A layer 4 inches deep consisting of approximately 2 inches of cinders and 2 inches of soil was stabilized in these tests. Moisture content of the road material varied from 6 to 16% during the tests, due to weather conditions. Two types of binder were used; an 85 to 100 penetration asphalt cement and a 150 to 200 penetration asphalt cement. Both types were heated to 300 to 330° F. during application.

Since the materials in the road were stratified, it was deemed desirable that a mixing and blending pass be made prior to application of the binder. This pass served to loosen the layer of soil to be stabilized, to blend and mix it thoroughly and uniformly, and to break up clay agglomerations prior to stabilization. This was done prior to each run. In this preliminary pass the cutting blades in the hood assembly were set to a depth of four inches. Each pass yielded about a six inch depth of loose mixed and blended material.

The application of the binder during the soil stabilization pass was made in the following manner: The Pulvi-Mixer was moved into position at one end of the mixing and blending pass, and the hood was lowered into position. The cutting blades were set to mix the full depth of loose material. Steam pressure of about 65 p.s.i. at the boiler was reduced to about 40 p.s.i. by the controls and turned on to check if all foam nozzles were functioning properly. Then bituminous soil stabilization was started. As soon as the mixer began moving forward the asphalt was turned on to the spray bar. During the soil stabilization pass the mixer travelled at a speed of 40 feet a minute. This was the slowest speed at which this machine could be operated. The binder was shut off a few feet ahead of the end of the run to permit the spray bar and nozzles to drain. As soon as this drainage was completed, the steam was shut off. Due to the speed of the mixer and the limited capacity of the asphalt pump on the kettle, it was found that only 1% of binder could be applied at each pass. It was also noted that under these conditions no asphalt pressure was developed at the nozzles. The nozzles functioned satisfactorily under this condition. To introduce the desired quantity of binder, about 6%, several successive soil stabilization passes had to be made. This, however, served a useful purpose, because the characteristics of the mix with increasing quantities of binder could be observed.

The test road was constructed in three eight foot wide parallel and adjacent lanes. The first outer lane was started by making a blending and mixing pass with the Pulvi-Mixer. Soon after this pass was made, an unforecast shower arrived and work was stopped. Then it continued to rain for two days for a total rainfall of 4 inches. This rainfall thoroughly saturated the loosened material and the subgrade in this lane. When work was again started, it was found that the soil contained 24% moisture. Consequently several aeration passes were made on successive days to dry out the soil. Bituminous soil stabilization was started when the soil moisture was at 16%. Four stabilization passes were made, introducing 4% of A.C. The binder was uniformly distributed in the mix which was somewhat spongy. Nevertheless it rolled well under a pneumatic roller and compacted tightly. In a few places where subgrade was still saturated, the pavement showed subgrade failure under traffic. After the subgrade had dried somewhat, two additional stabilization passes were made, adding 2% of binder, raising the total to 6%. Moisture content in the paving at this time was about 6%. This mixture rolled very well and compacted tightly. It showed no displacement other than a slight scuffing under traffic. The binder used in this lane was 150 to 200 penetration asphalt cement. The other outer lane was treated with 85 to 100 penetration asphalt cement. At the time of treatment soil moisture was about 8%. The first mixing and blending pass was followed by successive stabilization passes applying 6% binder to the soil. An excellent uniform mix was secured. Initial compaction was made with two passes of a Jackson vibrating compactor. Good compaction was secured. The center lane was processed in the same manner as the second outer lane. Soil moisture in this lane was about 6%, and 150 to 200 penetration asphalt cement was used as the binder. Compaction was secured by two passes of the Jackson vibratory compactor, followed by pneumatic tire rolling.

The test area was opened to traffic on each lane as it was completed. Behavior was observed under traffic for about a week. During this period no displacement in any of the lanes was noted. A slight surface scuffing, however, did occur, and to prevent further scuffing of this nature the entire test area was sealed. One-half was sealed with a single layer sand seal consisting of a prime coat of 0.1 gallon per square yard of MC–O cutback followed by 0.2 gallon per square yard of 150 to 200 penetration asphalt cement covered by 20 pounds per square yard of coarse sand. The other half was sealed with Schlamme applied at the rate of about 8 pounds per square yard, giving a layer about ⅛ inch in thickness. The paving in the test area gave excellent service during the four month period of the test. Traffic averaged about 400 cars per day, and weather during that period was comparatively severe, fluctuating between 90° F. and 10° F. in temperature and with heavy rains, sleet, freezing rain and about 4 inches of snow. At the end of that time, the pavement was tight, shed water easily, and showed no distress of any type.

EXAMPLE IV

In these tests, aggregates secured from an actual highway construction job were used. The gradation of these aggregates blended for the mix was as follows:

Blend of ¾–⅜ stone, 30%; preblended sand 35%; chips, 35%.

Table B

| Sieve No: | Total percent passing |
|---|---|
| 1 inch | 100 |
| ¾ inch | 99 |
| ½ inch | 92 |
| ⅜ inch | 81 |
| No. 4 | 60 |
| No. 8 | 46 |
| No. 30 | 25 |
| No. 50 | 18 |
| No. 100 | 10 |
| No. 200 | 6 |

The first sequence of tests was made using cold damp aggregates at 70° F. and containing about 3% moisture. Mixing was done in a small laboratory mixer similar to the one shown in Figure 1. The mixer was equipped with standard kneading paddle tips. Proportioned aggregates were placed into the mixer and mixed for 10 seconds, then 7.0% of an 85–100 penetration asphalt cement in the form of a foam was added through the nozzles, followed by a 30 second wet mix. The total mixing time was 47 seconds. In this mix an excellent mastic was formed with the fine aggregate and dust particles thoroughly and uniformly coated, but the coarse particles were only partially coated. When 150 to 200 penetration asphalt cement was used as the binder in this mix, an improved coating of coarse particles was obtained. When the moisture in the aggregates was raised to 8%, improved coating of the coarse particles was also secured.

The second sequence of tests made utilized aggregates dried and heated. The mix was prepared in the same manner as those in the first sequence. Excellent mixes were secured which produced test results equal to those of the construction mix control. This sequence of tests showed that the foamed binder method can be applied successfully to standard mixes, mixed in the conventional manner in regular pug mill mixers.

EXAMPLE V

Mixtures for pavement bases may be prepared by the method of this invention in the manner described above using various combinations of materials including mineral dusts and aggregates with bituminous binders. The mineral dust may be either limestone dust, processed pulverized loess or other soil, fly ash, marble dust or other mineral flour substantially passing No. 200 sieve. The aggregates may be any form of natural or crushed rock sands having any gradations between passing No. 10 and retained on No. 200 sieve, or natural gravels or crushed rock having any gradation between passing ¾ inch and retained on No. 10 sieves or any combination of sands and coarser aggregates. The combination of the aggregates, mineral dust and binder is as follows:

| | Percent |
|---|---|
| Aggregates | 60 to 70 |
| Mineral dust | 25 to 30 |
| Bituminous binder | 4 to 6 |

Various bituminous binders can be used, such as asphalt cements. These binders would be foamed at pressures of 25 to 100 p.s.i. and at temperatures necessary to maintain them as liquids—such temperatures being, for the examples above: asphalt cements—275 to 325° F.

EXAMPLE VI

Pavement wearing surfaces may be prepared by this method in the manner described using the various materials indicated for use in pavement bases as described in Example V. The combinations may be either ungraded or graded within smooth gradation curves. The approximate combination of materials for this purpose is as follows:

| | Percent |
|---|---|
| Aggregates | 60 to 80 |
| Mineral dust | 20 to 30 |
| Bituminous binder | 6 to 8 |

Paving mixtures made by this method, including bases and pavement wearing surfaces, may be laid in the usual manner spread either by hand or machine and then rolled to desired compaction. The bituminous binder may be the same as those set forth under Example V. The binder would be foamed at 25 to 100 p.s.i. and at a temperature that will maintain the respective binders in liquid phase, also as set forth in Example V.

EXAMPLE VIII

Slurry seal coat mixes used to rehabilitate or repair old worn-out pavements by resurfacing with very thin layers up to ¾ inch in thickness can be produced by this method. Materials similar to those described for pavement wearing surfaces may be used except that largest aggregate cannot be greater than ⅜ inch in size. In this case the slurry seal coat mixture is produced and laid at 400° F. as a slurry. In laying when the temperature is about 400° F. the mixture has a consistency of light molasses and can be screed and trowelled to a finished surface of the desired thickness. The combination of materials used is approximately as follows:

| | Percent |
|---|---|
| Aggregates | 60 to 80 |
| Mineral dust | 20 to 30 |
| Bituminous binder | 7 to 9 |

A specific example of a suitable bituminous binder is any of the asphalt cements. This binder would be foamed at about 25 to 100 p.s.i. and at a temperature of 275 to 300° F.

EXAMPLE VIII

A bituminous mix containing ungraded aggregates was produced by the foamed binder method and laid in the following manner:

Sand having particle sizes ranging between the No. 10–No. 40 sieves was dried and heated to 350° F. Seventeen and one-half (17½) pounds of the heated sand were placed into a laboratory twin shaft pug mill mixer equipped with either plate or open mesh paddle tips rotated at 125 r.p.m. and fitted with the necessary attachments to introduced dispersed foamed asphalt cement binder therein. Seven and one-half (7½) pounds of limestone dust at atmospheric temperature, having a gradation in which all particles passed the No. 10 sieve and at least 60% passed the No. 200 mesh sieve, were added to the sand in the mixer. A ten second mix was made to permit the dust to become heated and dispersed in a cloud in the top of the mixer. The foamed asphalt binder was then introduced into the mixer by the special nozzle. The binder used was a 150 to 200 penetration asphalt cement at 320° F. The binder was pumped to the nozzle at 50 p.s.i. where it was foamed and ejected from the nozzle in the form of a dispersed foam by saturated steam at 70 p.s.i. One and three-quarter (1¾) pounds of binder was introduced into the mixer in this manner by one nozzle in seven seconds. As soon as the required quantity of binder was introduced into the mixer, the mix was discharged into a receiver. The temperature of the mix was 290° F.

A number of mixes were made in this manner until 500 pounds of mix were accumulated. This was then transported out to the laying site. The mix at 275° F. was hand spread by rakes in the usual manner to a depth of 2 inches loose. This loose mix was then compacted by a vibratory compactor and steel rolled to a compacted depth of 1½ inches. Five hundred pounds of mix compacted to 1½ inch thickness produced about 3 square yards of pavement.

EXAMPLE IX

Sand similar to that used in Example VIII was heated to 450° F. Sand and limestone dust were proportioned as above, and mixed in a similar manner with the same quantity of binder introduced in the same manner. The temperature of the mix when discharged was about 400° F. The resultant mix at this temperature was a viscous liquid having a consistency of light molasses. The mix was then transferred to a heated kettle fitted with an agitator. The purpose of the portable heated kettle was to maintain the temperature of the mix at 400° F. during transport to the laying site. The mix was spread over a concrete pavement as it was discharged from the kettle by screeds to a depth of approximately ½ inch. As the mix cooled below 390° F., it thickened, thereby permitting trowelling to finish the surface. A 200 pound batch of mix covered a surface of about 4 square yards.

EXAMPLE X

A bituminous paving mixture containing damp graded aggregates can be produced in the following manner:

The composition of the aggregates in the mixture could be as follows:

| Total passing sieve: | Percent |
|---|---|
| ½ in. | 100 |
| ⅜ in. | 95–100 |
| No. 4 | 65–85 |
| No. 8 | 55–80 |
| No. 40 | 40–60 |
| No. 80 | 16–30 |
| No. 200 | 6–12 |

Damp aggregates proportioned to meet the above composition are placed into the twin shaft pug mill mixer. The aggregates contain about 6% moisture. The mixer is started and about 6% of additional water is added, making a total of about 12% moisture. The additional moisture gives the aggregates a pasty characteristic. As soon as a uniform pasty character is attained, the foamed asphalt is added in a mass of coherent bubbles. About 8% by weight of a 150 to 200 penetration asphalt cement is added in this manner. The mix is mixed in the mixer for about one minute, until all particles are coated with the binder. After mixing, the mixture is discharged from the mixer and carried to the laying site. As the mixture is spread in the pavement, the water contained in the mix is drained off, permitting the mixture to be compacted into a pavement.

Paving mixes having aggregate combinations as follows can similarly be prepared by this method:

| Total passing: | Percent |
|---|---|
| 1½ in. | 100 |
| 1 in. | 95–100 |
| ½ in. | 60–80 |
| No. 4 | 30–60 |
| No. 40 | 25–40 |
| No. 80 | 10–20 |
| No. 200 | 4–8 |

Same asphalt cement as before, about 6%.

| Passing Sieve No. | Retained on Sieve No. | Percent | |
|---|---|---|---|
| 4 | 10 | 0–2 | 0–4 |
| 10 | 40 | 10–30 | 10–40 |
| 40 | 80 | 20–55 | 20–55 |
| 80 | 200 | 12–25 | 8–20 |
| 200 | | 12–20 | 8–20 |
| Asphalt cement 150–200 penetration | | 9 | 8 |

EXAMPLE XI

A combination of damp sand having particle sizes ranging between the No. 10 and No. 40 sieves and limestone dust in which all particles passed the No. 100 sieve and at least 60% passed the No. 200 mesh sieve are placed in the mixer in a ratio of 70% sand and 30% limestone dust. Water is added to the mixture until a soft paste is attained. Total water content in this case is about 12%. To this mixture foamed asphalt cement 150–200 penetration is added and the mixture is mixed in the twin shaft pug mill mixer for about 1 minute until all particles are covered with binder. After discharging mixture from mixer, it is spread on the pavement. There the water in the mix rapidly drains off and the mixture is compacted.

A similar mix containing pulverized loess in place of the limestone dust is similarly produced.

These mixes are basically bituminous soil stabilization mixes, wherein local in-place soils may be found suitable in combination, or blends of sands or coarser particles may be required.

Since these mixes have been made in plant mixers, they can also be made in travel plants adapted to this method.

EXAMPLE XII

A bituminous slurry surfacing mixture was made of agricultural limestone having the following particle size distribution:

| Total percent passing: | |
|---|---|
| No. 4 sieve | 100 |
| No. 10 sieve | 90 |
| No. 40 sieve | 43 |
| No. 80 sieve | 29 |
| No. 200 sieve | 23 |

The agricultural limestone was placed into the mixer and water added until a soft paste is secured. About 16% total moisture was needed to attain the desired consistency. The foamed asphalt cement, 150–200 penetration, was added. About 13% binder was added in this manner. The asphalt cement at 320° F. was pumped to the nozzle at 50 p.s.i., while saturated steam at 70 p.s.i. was introduced into the nozzle to create the foam. Mixing was continued for one minute until the binder was uniformly distributed throughout the paste, coating the aggregate particles.

This mixture was then discharged into a mechanical plaster mixer where additional water was added to attain the desired laying consistency. In one case a total of 27% water was contained in the mix.

The mix was placed on the surface by buckets and spread by squeegees or soft hair brooms to the desired depth. The surface should be swept and dampened prior to spreading of the slurry. The slurry was spread at various depths from 1/8" to 1/4", depending upon its consistency. As soon as the slurry was spread the water in the mix drained off and the surfacing set in about 2 hours. The slurry can be laid in the rain.

Similar slurries were made in the same manner of coarse sand and pulverized loess, coarse sand and limestone dust. The coarse sand has particle sizes ranging between the No. 10 and No. 40 sieves. The pulverized loess and limestone dust had all particles passing the 100 mesh sieve and at least 50% passing the 200 mesh sieve. The combination of these materials was 70 to 75% sand and 25 to 30% loess or dust. About 13% water was required to attain mixing paste consistency and 22% total water for laying consistency.

Any gradation of sand may be used in proper proportion with dusts. Mixing paste consistencies will vary with gradation and proportion of materials.

The foregoing examples described batch-type operations but it will be understood that the method and appartus of this invention are readily adaptable to continuous operations. In a continuous plant the aggregate can be proportioned volumetrically and fed continuously into the mixer. The foamed asphalt can also be introduced continually. Using a mixer of the type described herein the aggregate would be fed in at one end and the completed mix removed from the other end, as the aggregate passes through the mixer the foamed asphalt would be continuously added in the proper proportion. Mixing would be accomplished as the material moves on in the mixer until it reaches the other end where it is discharged through the end of the mixer in a continuous flow of mixed material. The following claims are intended to cover both batch-type and continuous operations.

While in the foregoing specification this invention has been described in relation to specific embodiments thereof, and many details have been set forth for purpose of illustration, it will be apparent to those skilled in the art that the invention is susceptible to additional embodiments and that many of the details described herein can be varied without departing from the basic concepts of the invention.

I claim:

1. The method of combining an asphalt cement with a particulate solid material, comprising passing a stream of molten asphalt cement into a confined space under superatmospheric pressure injecting steam into said stream of molten asphalt cement within said confined space, whereby said asphalt cement is converted to a foamed condition, discharging said asphalt cement in foamed condition from said space through an orifice onto a particulate solid material, and mixing the discharged foamed binder with said particulate solid material under atmospheric pressure.

2. In a process for the stabilization of soil, the steps comprising mixing the raw soil in a moist, soft condition until a relatively homogeneous mixture is obtained, passing a stream of molten asphalt cement into a confined space under superatmospheric pressure, injecting steam into said stream of molten asphalt cement within said confined space, whereby said asphalt cement is converted to a foamed condition, discharging said asphalt cement in foamed condition from said space through an orifice onto said soil mixture, and combining said soil mixture with the discharged foamed asphalt under atmospheric pressure and without substantially reducing the water content of said soil mixture.

3. The method of combining an asphalt cement with an aggregate material, comprising pumping a stream of molten asphalt cement into a confined space, separately introducing saturated steam into said confined space, bringing said asphalt cement and said steam into intimate contact within said space under a superatmospheric pressure below 125 pounds per square inch, whereby said asphalt cement is converted to a substantially homogeneous asphalt foam, discharging said homogeneous asphalt foam from said space through an orifice onto an aggregate material, and mixing the discharged asphalt foam with said aggregate material under atmospheric pressure.

4. The method of claim 3 in which said material is a mineral aggregate having a moisture content ranging from 4 to 22% by weight of the material on a dry basis.

5. The method of claim 3 wherein said aggregate material includes a major proportion of a natural ungraded aggregate material.

6. The method of claim 3 in which said aggregate material comprises from 20 to 30% of mineral flour and from 70 to 80% by weight of a natural ungraded aggregate material.

References Cited in the file of this patent

UNITED STATES PATENTS

| | | |
|---|---|---|
| 592,708 | Howe | Oct. 26, 1897 |
| 1,188,081 | Kirschbraun | June 20, 1916 |
| 1,727,231 | Downard | Sept. 3, 1929 |
| 1,764,534 | Shannon | June 17, 1930 |
| 1,806,250 | Hack | May 19, 1931 |
| 2,043,599 | Waldschmidt | June 9, 1936 |
| 2,283,192 | Ditto | May 19, 1942 |
| 2,459,520 | Greenshields | Jan. 18, 1949 |
| 2,478,162 | Sommer | Aug. 2, 1949 |
| 2,547,403 | Madsen | Apr. 3, 1951 |
| 2,726,852 | Sommer | Dec. 13, 1955 |
| 2,768,089 | Erickson | Oct. 23, 1956 |
| 2,780,557 | Hardman et al. | Feb. 5, 1957 |
| 2,787,450 | Wylie | Apr. 2, 1957 |

UNITED STATES PATENT OFFICE
CERTIFICATE OF CORRECTION

Patent No. 2,917,395                                            December 15, 1959

Ladis H. Csanyi

It is hereby certified that error appears in the printed specification of the above numbered patent requiring correction and that the said Letters Patent should read as corrected below.

Column 15, line 51, claim 1, after the word "pressure" insert a comma.

Signed and sealed this 31st day of May 1960.

(SEAL)
Attest:

KARL H. AXLINE
Attesting Officer

ROBERT C. WATSON
Commissioner of Patents